Patented Apr. 24, 1951

2,550,570

UNITED STATES PATENT OFFICE 2,550,570

METHOD OF PROCESSING OIL AND THE PRODUCT PRODUCED

Charles E. Lane, Jensen Beach, Fla., assignor to The Borden Company, New York, N. Y., a corporation of New Jersey No Drawing. Application December 8, 1948, Serial No. 64,232

2 Claims. (Cl. 195—3)

The present invention relates to a process for manufacturing vitamin A from fish liver oil. Heretofore, vitamin A has been manufactured from fish livers by treating the liver with caustic soda in order to break down the liver tissue and thus liberate the oil. This method has not been entirely satisfactory because only the vitamin A which was naturally present was obtainable from such livers. Moreover, this process destroyed the protein in the livers to render it unsatisfactory for use as a feed or even as a fertilizer. Such prior methods made necessary large and cumbersome shore organizations and equipment. The present invention reduces the size and complexity of these prior operations.

It was, therefore, a general object of the present invention to provide a process for the manufacture of vitamin A from marine fish.

It was a further object of the present invention to provide a method for increasing the amount of vitamin A obtainable from the oil of the marine fish, particularly the oil obtainable from fish livers.

Other objects will in part be obvious, and will in part appear hereinafter.

According to the present invention there is provided a process for manufacturing vitamin A from fish liver oil which contain vitamin A precursor materials, wherein the pH of said oil is adjusted within a range of 7.0-9.0 and the oil thereafter treated with enzymic materials which are contained in the small intestine of marine fish. In the now preferred practice, the particular fish liver oil employed as the starting material is that which contains vitamin A precursor materials which absorb maximally in the spectrophotometric range of 295 to 315 millimicrons. The following description comprises the now preferred process of the invention.

The entire visceral mass comprising the liver, stomach, small and large intestines, pancreas and spleen of an elasmobranch is ground in a meat chopper or similar device and maintained in as fresh a condition as practicable. The pH of the resulting mixture is then decreased or is lowered to below 7.0 by the addition of a mineral acid, preferably to approximately a pH of 1.9-2.5. The oil is thus liberated from the liver by enzymatic digestion of the liver tissue.

The mixture is then agitated until proteolytic digestion has been completed. Depending upon the temperature, this digestion usually requires from 6 to 24 hours. Upon completion of the acid phase of the digestion, the pH is next adjusted within a range of 7.0-9.0, preferably in the range of 8.0-8.5, through the addition of an alkaline material such as sodium hydroxide, ammonium hydroxide, sodium bicarbonate, organic amines and the like. Then with continued agitation, the digest is allowed to remain at this pH for a period of 1 to 24 hours. If the pH drops below 7.0, more alkaline material is added to adjust to about 7.0-9.0. The mass is then filtered or centrifuged to separate the oil from the hydrolyzed tissue and solvents.

It is apparent that the simplicity of this process lends itself admirably to use aboard fishing vessels. Thus, the grinding, digesting and modifying activities of the enzymes may easily be accomplished at sea before returning to port, thus reducing the size of the necessary shore operation to that of a centrifugal or other separation of the oil from the hydrolyzed tissue.

The fish liver oil which may be employed in carrying out the present invention is preferably obtained from the livers of the elasmobranchs; such as shark, dogfish, skates, rays, and the like. Some results have also been realized with the use of oils obtained from the tuna and halibut, but the best results are obtained from use of the shark livers, such as hammerhead, black-tip, sand, dusty, lemon, night, cow, bull, leopard, tiger, silk, great white, and the like, both male and female.

The following examples are given by way of illustrating the invention and not by way of limitation. Unless otherwise specified all parts are by weight.

EXAMPLE 1

Immediately after catching a female black-tip shark having a hide length of 45 inches, the liver, stomach, pancreas, spleen and small intestines were removed. Next the liver was separated from the viscera. The liver was then ground through a meat grinder. The remaining visceral materials were then ground together by passing through a meat grinder, and the ground liver and the ground visceral mass then brought together in a glass digestion vessel where they were thoroughly mixed. The fresh liver before grinding was found to contain 20.4 million (20,400,000) total U. S. P. units of vitamin A.

To this ground mixture there was then added 750 ml. of a 10% solution of HCl in order to bring the mixture to a pH of 2.05. The digestion vessel was then immersed in a water bath at 35° C. for a period of 3½ hours. After 3½ hours at this temperature, the pH of the mass was found to have risen to 2.3. There was then added 800 ml.

of 10% solution of NaOH so as to adjust the pH to 8.7, and the digest was mixed thoroughly and permitted to stand for 1 hour. After one hour the digest was then centrifuged to separate the oil from the aqueous phase. Substantially all of the tissue solids had become dissolved. The yield of oil after centrifuging was found to be 2800 grams. The oil recovery was 92.5% and the vitamin A recovery was 23.0 million (23,000,000) units. Thus, the vitamin A which was recovered is equivalent to 113% of the theoretical amount present in the original starting material. By following this teaching there is provided a method whereby a substantial increase in vitamin A may be obtained over that originally present, and which is ordinarily obtainable under normal extraction methods.

A balance sheet of the process illustrated by Example 1 is as follows:

Input in grams and U. S. P. units of vitamin A

| Organ | Solids | Oil | Water | Vitamin A |
|---|---|---|---|---|
| | | | | Mu [1] |
| Liver | 356 | 2,997 | 1,629 | 20.4 |
| Viscera | 181 | 0 | 726 | 0 |
| Total | 537 | 2,997 | 2,355 | 20.4 |

[1] Mu means million units.

Recovery in grams and U. S. P. units of vitamin A

| Total | 562 | 2,806 | 3,671 | 23.0 |
|---|---|---|---|---|

*Example 2*

After capturing a hammerhead shark the liver, stomach, pancreas, spleen and small intestines were removed, and the liver separated from the remainder of the visceral mass. The weight of the liver was 50 pounds. The fresh liver was immediately placed in a meat chopper and ground to small bits. A small sample of the ground liver was removed for control and assay purposes, and the remainder of the ground liver was mixed with 10.0 pounds of the fresh comminuted visceral material comprising the stomach, small intestines, pancreas and spleen which had been previously ground separately from the liver. The fresh ground liver and the fresh ground viscera were then mixed thoroughly together and the pH adjusted to 2.3 by addition of sufficient hydrochloric acid, which in this case called for approximately 2.5 liters of 10% HCl.

The mass was then maintained at a temperature of 37° C. for five hours at this adjusted pH. After five hours had elapsed the mass was made slightly alkaline by adjusting the pH to approximately 7.5, in this instance through the addition of about 3.0 liters of 10% NaOH. The mass was held at pH of about 7.5 for one hour and then centrifuged. The oil was recovered and tested for vitamin A content. Control assays run on a sample of liver, after grinding but before processing, showed that the liver initially contained 62.6% oil, thus indicating a total oil content of 31.3 pounds in the original 50 pound sample of liver. The free oil from the untreated control sample was tested and assayed 42,950 international units of vitamin A per gram which is equivalent to 610 million (610,000,000) units of vitamin A in the original 50 pound sample.

After processing, digestion and centrifugation, 28 pounds of oil were recovered and tested. This oil assayed 52,600 international units of vitamin A per gram, or a total of 667.5 million (667,500,000) units of vitamin A in the original 50 pound sample of the liver. The process thus resulted in an increase of 57.5 million (57,500,000) units of vitamin A over the amount originally present in the untreated liver.

Oil from the untreated control sample of liver showed E300/328 ratio of 0.955. The finished oil showed E300/328 of 0.729, indicating that some of the precursor materials that absorb in the range around 300 millimicrons had been converted into material absorbing in the true vitamin A range.

A convenient method for identifying and measuring the concentration of vitamin A is by means of an ultraviolet spectrophotometer. Vitamin A absorbs maximally at 328 millimicrons. Other pigmented substances show maximal absorption at different wavelengths. For example, beta carotene absorbs maximally at 452, riboflavin at 267, thiamin at 230 and so forth. The purity of the vitamin A preparation may be estimated by determining its freedom from extraneous absorption. This is indicated by determining the ratio of absorption at 300 millimicrons to that at 328. Thus, pure synthetic vitamin A shows a ratio of absorption at 300/328 of 0.51 to 0.53. These principles have been used in making vitamin A determinations in the present invention.

Many variations of the process of the invention may suggest themselves; for example the liver and remainder of the visceral mass may be ground together and then treated in manner described. Alternatively, after the proteolytic phase of digestion is substantially complete, and before subsequent pH adjustment, the entire digest may be frozen solid. After thawing and elevation of pH to 7-9 the intestinal enzyme system will function as efficiently as ever. Digests have been maintained in a frozen state for as long as six months.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In converting precursor of vitamin A to the vitamin, the method which comprises forming a mixture of a marine fish liver oil and enzyme of the small intestine of the fish, establishing the pH within the range 7 to 9, maintaining contact of the oil with the enzyme, within the pH range stated, until there is a substantial increase in the vitamin A content of the oil, and then separating the treated oil from non-oily material without change of state.

2. In separating marine fish liver oil and vitamin A contained therein from the fish liver and converting a precursor of vitamin A to the vitamin, the method which comprises macerating marine fish liver with other parts of the viscera of the fish including stomach and small intentine enzymes, adding an acid to the macerated mass in amount to establish the pH approximately within the range 1.9 to 2.5, maintaining contact between the added acid and the macerated mass until the enzymatic action liberates oil from the macerated mass, then adding to the resulting product an alkali in amount to establish the pH within the range 7 to 9, maintaining contact of the added alkali and the said product until tests show conversion of vitamin A precursor to the vitamin, by increase of the vitamin to an amount substantially above the original content, and then separating the resulting vitamin-containing oil from the remainder of the mass, without change of state.

CHARLES E. LANE.

REFERENCES CITED

The following references are of record in the file of this patent:

UNITED STATES PATENTS

| Number | Name | Date |
| --- | --- | --- |
| 2,395,790 | Parfentjev | Feb. 26, 1946 |
| 2,406,249 | Parfentjev | Aug. 20, 1946 |
| 2,423,102 | Keil | July 1, 1947 |